US008321282B2

(12) United States Patent
Sano

(10) Patent No.: US 8,321,282 B2
(45) Date of Patent: Nov. 27, 2012

(54) ARTICLE SALES DATA PROCESSING APPARATUS AND CONTROL METHOD FOR THE SAME

(75) Inventor: Takeshi Sano, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 121 days.

(21) Appl. No.: 12/859,507

(22) Filed: Aug. 19, 2010

(65) Prior Publication Data

US 2011/0055028 A1   Mar. 3, 2011

(30) Foreign Application Priority Data

Sep. 2, 2009   (JP) .................................. 2009-202946

(51) Int. Cl.
*G06Q 20/00* (2012.01)
(52) U.S. Cl. ................ 705/16; 705/21; 705/64; 705/65; 705/407; 235/383; 235/470
(58) Field of Classification Search .................... 705/16, 705/21, 64, 65, 18; 235/383, 470
See application file for complete search history.

(56) References Cited

U.S. PATENT DOCUMENTS

| 6,934,688 | B2* | 8/2005 | Carter ............................ 235/382 |
| 7,367,498 | B2* | 5/2008 | Kodaka et al. ................ 235/383 |
| 2001/0047302 | A1* | 11/2001 | Yoshinaga et al. .............. 705/15 |
| 2004/0199474 | A1* | 10/2004 | Ritter .............................. 705/65 |
| 2006/0026074 | A1* | 2/2006 | Fujimoto ........................ 705/24 |
| 2008/0091519 | A1* | 4/2008 | Foss ................................ 705/10 |
| 2009/0055281 | A1* | 2/2009 | DeMedio et al. ............... 705/21 |
| 2010/0082444 | A1* | 4/2010 | Lin et al. ........................ 705/17 |
| 2011/0238475 | A1* | 9/2011 | Coelho et al. .............. 705/14.23 |

FOREIGN PATENT DOCUMENTS

| JP | 06-004775 | 1/1994 |
| JP | 2009-059321 | 3/2009 |

OTHER PUBLICATIONS

Japanese Office Action for Japanese Patent Application No. 2009-202946 mailed on Aug. 2, 2011.

* cited by examiner

*Primary Examiner* — Vanel Frenel
(74) *Attorney, Agent, or Firm* — Turocy & Watson, LLP

(57) ABSTRACT

According to one embodiment, an article sales data processing apparatus includes a storage unit, a selection acceptance unit, a confirmation unit, and a payment processing unit. The storage unit stores, for each article sold, sales data and information indicating a payment method prohibited for that article, of plural payment methods. The selection acceptance unit accepts selection of payment method. The confirmation unit refers to the information stored in the storage unit and confirms whether articles sold include an article for which payment by the payment method with its selection accepted by the selection acceptance unit is prohibited. If it is confirmed that the articles sold include an article for which payment is prohibited, the payment processing unit notifies that the articles sold include an article for which payment is prohibited, and executes payment for articles for which the same payment method is not prohibited, by the same payment method.

8 Claims, 6 Drawing Sheets

FIG. 3

Table 30 (with Prohibition flags):

| No | Article code | Article name | Number of items sold | Unit price | Voucher | Electronic money | Credit | Cash |
|---|---|---|---|---|---|---|---|---|
| | www | WWW | | 100 | 1 | 0 | 0 | 0 |
| | xxx | XXX | | 200 | 0 | 0 | 0 | 0 |
| | yyy | YYY | | 300 | 0 | 1 | 1 | 0 |
| | zzz | ZZZ | | 400 | 1 | 1 | 0 | 0 |

Table 31 (with Prohibition flags and Payment completion flag):

| No | Article code | Article name | Number of items sold | Unit price | Amount | Voucher | Electronic money | Credit | Cash | Payment completion |
|---|---|---|---|---|---|---|---|---|---|---|
| 1 | www | WWW | 1 | 100 | 100 | 1 | 0 | 0 | 0 | 0 or 1 |
| 2 | xxx | XXX | 2 | 200 | 400 | 0 | 0 | 0 | 0 | 0 or 1 |
| 3 | yyy | YYY | 2 | 300 | 600 | 0 | 1 | 1 | 0 | 0 or 1 |
| 4 | zzz | ZZZ | 3 | 400 | 1200 | 1 | 1 | 0 | 0 | 0 or 1 |

32 — Number of items sold: 4 | Total amount: 1000

33 — Amount paid: 2000

34:
| Voucher | 1 or 0 |
| Electronic money | 1 or 0 |
| Credit | 1 or 0 |
| Cash | 1 or 0 |

35 — Registration-in-progress flag: 1 or 0 | Subtotal flag: 1 or 0

ARTICLE SALES DATA PROCESSING APPARATUS AND CONTROL METHOD FOR THE SAME

CROSS-REFERENCE TO RELATED APPLICATIONS

This application is based upon and claims the benefit of priority from Japanese Patent Application No. 2009-202946, filed Sep. 2, 2009; the entire contents of which are incorporated herein by reference.

FIELD

Embodiments described herein related generally to an article sales data processing apparatus such as a POS (point of sales) terminal which can process, by plural methods, the payment of the price of an article purchased by a customer, and a control method for the apparatus.

BACKGROUND

At the time of paying the price of registered articles with a conventional POS terminal, if an article that cannot be purchased by a specific measure, for example, by a voucher, exists together with other articles in one transaction, the transaction cannot be completed unless the article in question is deleted.

In this case, it is necessary to delete the article in question, then conclude the transaction by a specific payment method, register the canceled article again, and conclude the transaction by another payment method. Thus, the user is forced to carry out troublesome operations.

In view of such circumstances, an article sales data processing apparatus is desired which can process one transaction without forcing the user to carry out the troublesome operations and thus can efficiently proceed with one transaction even if articles purchased by a customer wanting to use a specific payment method include an article for which that specific payment method is prohibited.

BRIEF DESCRIPTION OF THE DRAWINGS

FIG. 3 shows a main memory area formed in a RAM of the POS terminal.

DETAILED DESCRIPTION

Figure 1:
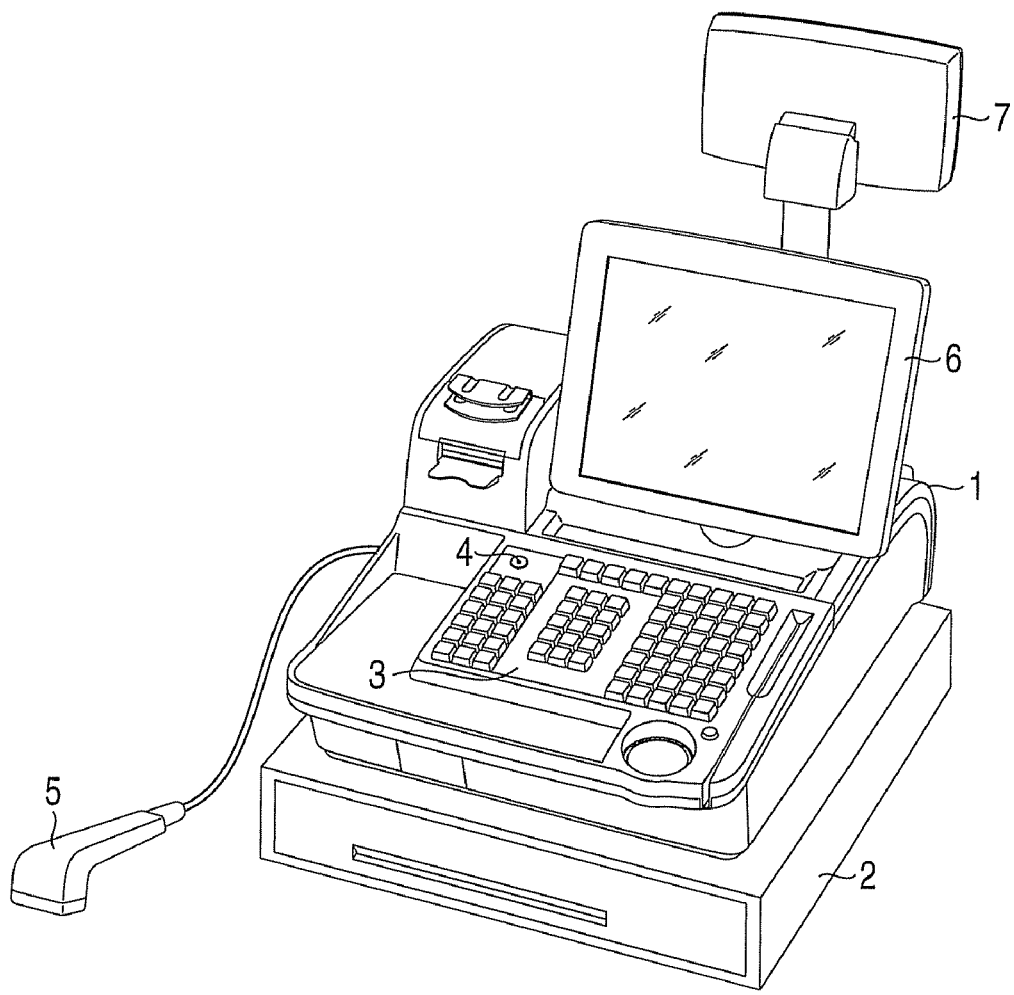
FIG. 1 is a perspective view showing the outer configuration of a POS terminal according to an embodiment.

In general, according to one embodiment, an article sales data processing apparatus includes a storage unit, a selection acceptance unit, a confirmation unit, and a payment processing unit. The storage unit stores, for each article sold in one transaction, sales data including at least the amount for the article, and information indicating a payment method prohibited for that article, of plural payment methods. The selection acceptance unit accepts selection of a payment method from the plural payment methods. The confirmation unit refers to the information stored in the storage unit and confirms whether articles sold in the one transaction include an article for which payment by the payment method with its selection accepted by the selection acceptance unit is prohibited. If it is confirmed by the confirmation unit that the articles sold in the one transaction include an article for which payment by the selection-accepted payment method is prohibited, the payment processing unit notifies that the articles sold in the one transaction include an article for which payment by the selection-accepted payment method is prohibited, and executes payment for articles for which the selection-accepted payment method is not prohibited, by the same payment method.

Hereinafter, an embodiment will be described with reference to the drawings. In the description, the same parts across all the drawings are denoted by the same reference numerals. In this embodiment, a POS terminal 1 installed in a retail store where articles are sold is described as an example.

Outer Configuration of POS Terminal 1

FIG. 1 is a perspective view showing the outer appearance of the POS terminal as an embodiment of an article sales data processing apparatus. As shown in FIG. 1, the POS terminal 1 is placed on a drawer 2 for housing cash and the like and controls the opening and closing of the drawer 2.

The POS terminal 1 has a keyboard 3, a mode switch 4, a barcode scanner 5, a cashier-side display device with touch panel 6, and a customer-side display device 7.

On the keyboard 3, numeric keys for inputting numeric data, a subtotal key, a deposit or current total key, a credit card key, a voucher key, an electronic money key, a cancel key, a clear key and the like are arranged. The deposit or current total key, the credit card key, the voucher key, and the electronic money key are payment keys. That is, the deposit or current total key is to declare the completion of registration of one entire transaction or partial payment of the transaction, by cash. The credit card key is to declare the completion of registration of one entire transaction or partial payment of the transaction, by credit card. The voucher key is to declare the completion of registration of one entire transaction or partial payment of the transaction, by voucher. The electronic money key is to declare the completion of registration of one entire transaction or partial payment of the transaction, by electronic money. The cancel key is to declare the cancellation of the registered article sales data. In this way, the keyboard 3 having the payment keys to designate one of plural payment methods functions as a selection acceptance unit in this embodiment.

The mode switch 4 selectively switches various operation modes including "registration", "inspection", "settlement", and "setting". Here, "registration" is an operation mode in which sales registration of sales data of an article that is identified with an article code inputted by the barcode scanner 5 or the like, in the storage unit, is carried out and payment data of a transaction declared as completion of registration by an operation of the payment key is processed to issue a receipt. "Inspection" is an operation mode in which cumulative data of the sales data that is sales-registered in the storage unit in the "registration" mode is outputted as an inspection report. "Settlement" is an operation mode in which cumulative data in the storage unit is outputted as a settlement report, as in the "inspection" mode, and then the content of the storage unit is cleared. "Setting" is an operation mode in which necessary data to execute various operations are preset in the storage unit.

The cashier-side display device 6 and the customer-side display device 7 display the article name of an article that is sales-registered, the number of items sold, the amount of sales, the total amount for one transaction, the amount of deposit, the amount of change and the like.

Control Circuit of POS Terminal 1

Figure 2:
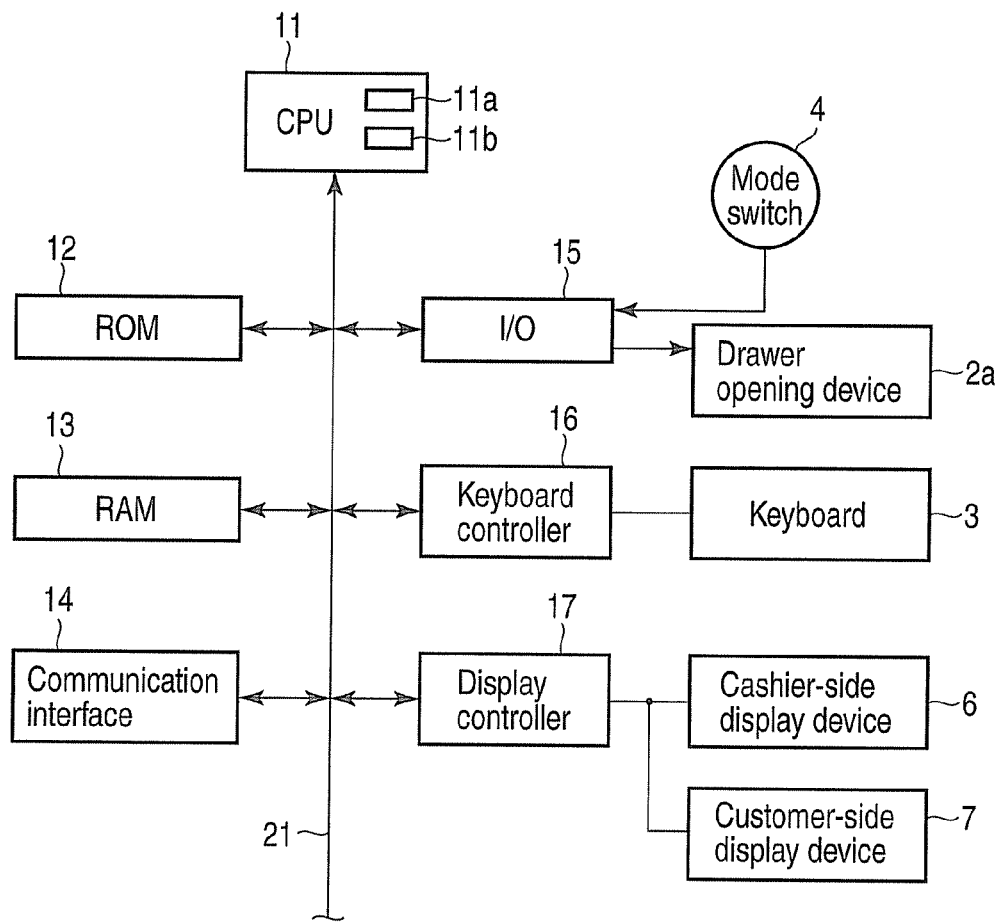
FIG. 2 is a block diagram showing a control circuit of the POS terminal.

FIG. 2 is a block diagram showing a control circuit of the POS terminal 1. As shown in FIG. 2, the POS terminal 1 has a CPU (central processing unit) 11 which centrally controls each unit that will be described hereinafter, a ROM (read only memory) 12, a RAM (random access memory) 13, a communication interface 14, an I/O port 15, a keyboard controller 16, a display controller 17 and the like.

The CPU 11, the ROM 12, the RAM 13, the communication interface 14, the I/O port 15 and the controllers 16 and 17 are connected by a bus line 21 such as address bus or data bus, thus forming the control circuit.

The ROM 12 stores fixed data such as computer programs executed by the CPU 11.

The RAM 13 functions as a work area in which various data are stored in a rewritable manner. Particularly in the processing described below, the RAM 13 functions as a storage unit to carry out sales registration of article sales data or the like.

The communication interface 14 connects to a store computer (not shown) via a network. The CPU 11 communicates data with the store computer via the communication interface 14.

The I/O port 15 connects to the mode switch 4 and a drawer opening device 2a. A signal from the mode switch 4 is inputted to the CPU 11 via the I/O port 15. Moreover, in response to a command from the CPU 11, a driving signal is outputted to the drawer opening device 2a via the I/O port 15. On receiving the driving signal, the drawer opening device 2a automatically opens the drawer 2.

The keyboard controller 16 controls the keyboard 3, takes in a key signal corresponding to a key that is operated for input, and notifies the CPU 11 of the key signal.

The display controller 17 controls screen displays on the cashier-side display device 6 and the customer-side display device 7 in response to a command from the CPU 11. For example, the display controller 17 causes the cashier-side display device 6 and the customer-side display device 7 to display the article name of an article that is sales-registered, the number of items sold, the amount of sales, the total amount for one transaction, the amount of deposit, the amount of change and the like.

In the RAM 13, an article table 30, a transaction buffer 31, a total buffer 32 (hereinafter referred to as total buffer), a paid amount buffer 33, a payment method flag memory 34, and a transaction flag memory 35 are formed, as shown in FIG. 3.

The article table 30 stores, for each article code of article, the article name, the unit price, and each prohibition flag, of the article identified with the article code.

The transaction buffer 31 stores, for all the articles that are sold in one transaction, sales data including the article code, the article name, the number of items sold, the unit price and the amount (the number of items sold multiplied by the unit price), and records including each prohibition flag stored in the article table 30 with respect to the article and a payment completion flag, in order of record number.

The prohibition flag is prepared for each of payment method types including voucher, electronic money, credit card, and cash. A value of the prohibition flag is set to "1" if payment by the payment method is prohibited for the article identified with the article code, and is set to "0" if the payment method is not prohibited. In the case of the article table 30 shown in FIG. 3, for example, payment can be made for an article xxx by any of the payment methods, and payment by credit card and by electronic money is prohibited for an article yyy. The payment completion flag is a flag indicating whether payment is completed or not. That is, the payment completion flag is "1" for an article for which the payment of the price is completed in one transaction and "0" for an article for which the payment of the price is yet to complete.

The total buffer 32 stores the number of items sold and the total amount for articles for which payment can be made by a selected payment method, where one of the deposit and current total key, the credit card key, the voucher key and the electronic money key on the keyboard 3 is selected. That is, for example, if payment by voucher is selected, the articles for which payment by voucher can be made are xxx and yyy in the transaction buffer 31 shown in FIG. 3. Therefore, the values stored in the total buffer 32 are the number of items sold 4 and the total amount 1000 yen.

The paid amount buffer 33 stores the amount paid. The payment method flag memory 34 stores the payment flag corresponding to each payment method such as voucher, electronic money, credit card, and cash. Each payment flag corresponds to one of the above payment keys. If one of the payment keys is operated, the corresponding payment flag turns to "1" and the other payment flags turn to "0".

The transaction flag memory 35 stores a registration-in-progress flag and a subtotal flag. Each of the registration-in-progress flag and the subtotal flag is set to "1" or "0".

The CPU 11 in this embodiment executes a control program stored in the ROM 12 and thus realizes the functions of a confirmation unit 11a and a payment processing unit 11b.

The confirmation unit 11a refers to the prohibition flags stored in the transaction buffer 31 and confirms whether articles sold in one transaction include an article for which payment by the payment method with its selection accepted via the payment key is prohibited.

If it is confirmed by the confirmation unit 11a that the articles sold in one transaction include an article for which payment by the selection-accepted payment method is prohibited, the payment processing unit 11b notifies that the articles sold in one transaction include the article for which payment by the selection-accepted payment method is prohibited, using the cashier-side display device 6, and then accepts a selection as to whether to execute payment by the selection-accepted payment method for the articles for which payment by the same payment method is not prohibited. If a selection to execute payment is accepted, the payment processing unit 11b executes payment by the same payment method. Meanwhile, if it is confirmed by the confirmation unit 11a that an article for which payment by the same payment method is prohibited is not included, the payment processing unit 11b executes payment for all the articles sold in the transaction by the same payment method.

Operation of POS Terminal 1

Next, the operation of the POS terminal 1 having the configuration as described above will be described.

Figure 4:
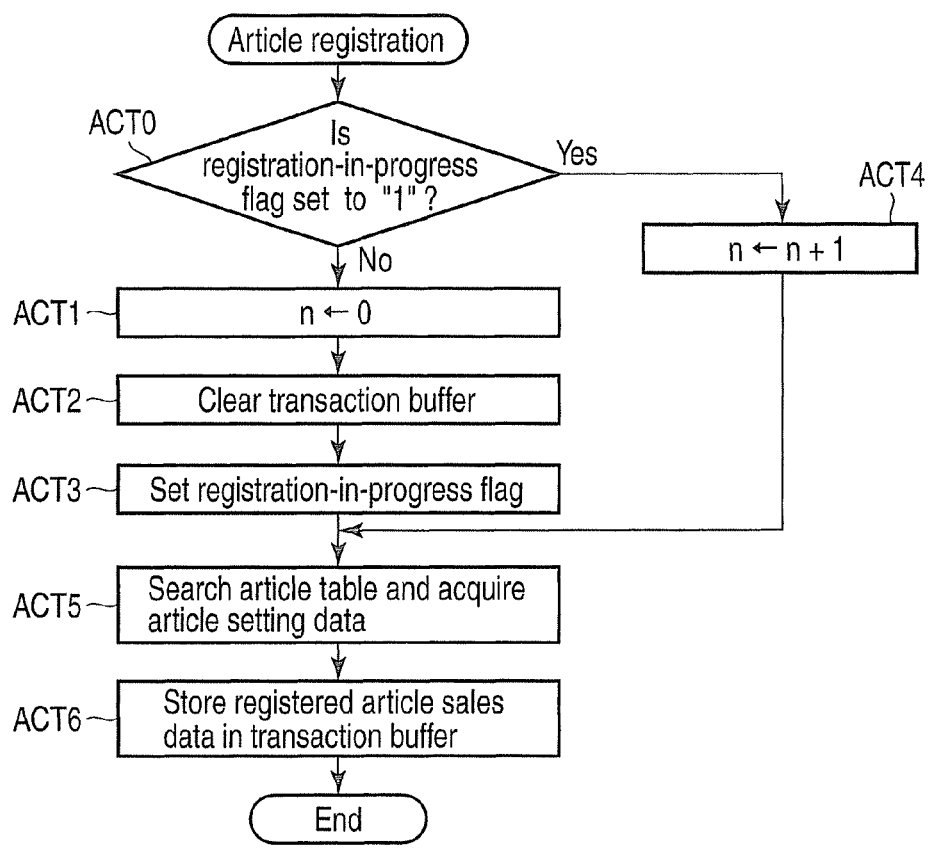
FIG. 4 is a flowchart showing procedures for article registration executed by a CPU of the POS terminal.

The CPU 11 executes sales registration shown in the flowchart of FIG. 4 if scanning by a barcode reader 10 is carried out or an article code is inputted by operation of numeric keys on the keyboard 3 in the state where the "registration" operation is selected by the mode switch 4. This processing is realized by a control program in the ROM 12.

If an article code is inputted, the CPU 11 first confirms whether the registration-in-progress flag in the transaction flag memory 35 is set to "1" or not (ACT 0). The registration-in-progress flag is set to "0" when one transaction is completed. Therefore, if the registration-in-progress flag is "0" when an article code is inputted, the article code is the code of an article that is handled in a new transaction. If the registration-in-progress flag is "1", the article code is the code of an article that is handled in the transaction currently in progress.

If the registration-in-progress flag is not to "1" (NO in ACT 0), the article is the first item to be registered for sales in one transaction. Therefore, the CPU 11 set a count value n (n being a natural number) to zero (ACT 1) and clears the transaction buffer 31 (ACT 2). Here, the count value n is a value used for sequentially storing article information corresponding to the article code in the transaction buffer 31. That is, the article information is stored in the transaction buffer 31 in order of record number in accordance with the count value n in the CPU 11.

After clearing the transaction buffer 31, the CPU 11 sets the registration-in-progress flag in the transaction flag memory 35 to "1" (ACT 3).

Next, the CPU 11 searches the article table 30 for the inputted article code and acquires article setting data including the corresponding article name, unit price and prohibition flags (ACT 5). After that, the CPU 11 stores the acquired data in the transaction buffer 31 (ACT 6).

On the other hand, if the registration-in-progress flag is set to "1" in ACT 0, the article is the second or subsequent item to be registered for sales. Therefore, the CPU 11 increases the count value n by "1" (ACT 4). After that, the CPU 11 executes the processing of ACT 5 and ACT 6. Every time an article code is inputted, the CPU 11 executes the processing of ACT 0 to ACT 6.

Figure 5:
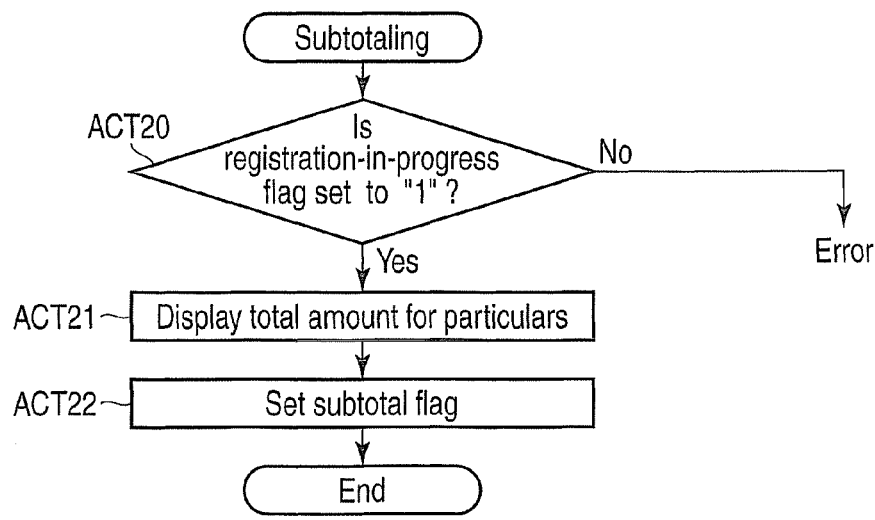
FIG. 5 is a flowchart showing procedures for subtotaling executed by the CPU of the POS terminal.

Meanwhile, if the subtotal key is operated, the CPU 11 executes subtotaling, shown specifically in FIG. 5. This processing is realized by a control program in the ROM 12.

That is, if there is a notification from the keyboard controller 16 that the subtotal key is operated, the CPU 11 checks the transaction flag memory 35 (ACT 20). Here, if the registration-in-progress flag in the transaction flag memory 35 is set to "1" (YES in ACT 20), the CPU 11 calculates the total number of items sold and the total amount in the transaction buffer 31 and causes the cashier-side display device 6 to display the total number of items sold and the total amount (ACT 21). After that, the CPU 11 sets the subtotal flag in the transaction flag memory 35 to "1" (ACT 22). If the registration-in-progress flag in the transaction flag memory 35 is not set to "1" in ACT 20 (NO in ACT 20), the CPU 11 executes error processing.

Figure 6:
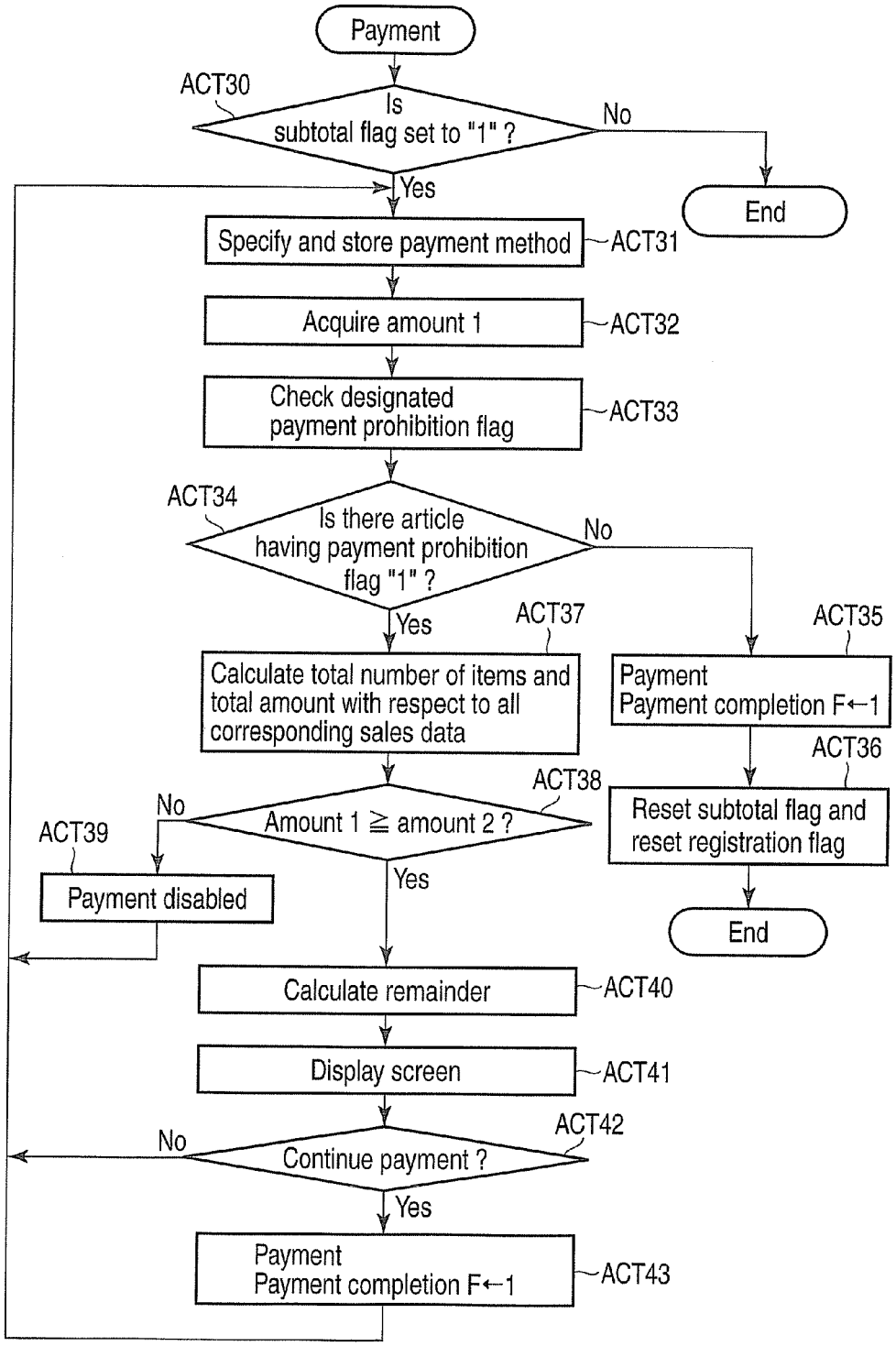
FIG. 6 is a flowchart showing procedures for payment executed by the CPU of the POS terminal.

Also, if one of the payment keys such as the voucher key is operated, for example, the CPU 11 executes payment, shown specifically in FIG. 6. This processing is executed mainly by the confirmation unit 11a and the payment processing unit 11b.

If there is a notification from the keyboard controller 16 that one of the payment keys is operated, the CPU 11 confirms the transaction flag memory 35 (ACT 30). Here, if the subtotal flag in the transaction flag memory 35 is set to "1" (YES in ACT 30), the CPU 11 decides the payment method corresponding to the operated payment key as the payment method selected by the customer. In this case, the CPU 11 sets the payment flag in the payment method flag memory 34 corresponding to the selected payment method to "1" and resets the payment flags corresponding to all the other payment methods to "0" (ACT 31). Moreover, the CPU 11 acquires the amount paid by the selected payment method and stores the amount paid in the paid amount buffer 33 (ACT 32). Hereinafter, the value of this amount is referred to as amount 1. The amount 1 is, for example, the amount of cash inputted by the cashier via the keyboard 3 where the customer hands this amount of cash to the cashier in the case of payment by cash, or the amount on a voucher handed to the cashier by the customer in the case of payment by voucher, or the amount of electronic money stored in the customer's electronic money storage medium in the case of payment by electronic money.

Next, the CPU 11 confirms whether the articles stored in the transaction buffer 31 include an article for which payment by the payment method confirmed in ACT 31 is prohibited. In this processing, the payment flags and the payment completion flags are used. That is, the CPU 11 checks whether the sales data having the payment completion flag "0" stored in the transaction buffer 31 include sales data having the payment type prohibition flag "1" corresponding to the payment flag set to "1" in ACT 31 (ACT 33). If such sales data is stored (YES in ACT 34), the CPU 11 calculates the total number of items and the total amount with respect to all these sales data and stores the results in the total buffer 32 (ACT 37). Hereinafter, the value of this amount is referred to as amount 2.

Next, the CPU 11 compares the amount 1 stored in the paid amount buffer 33 with the amount 2 stored in the total buffer 32 (ACT 38). If the amount 1 is smaller than the amount 2 (amount 1<amount 2) (NO in ACT 38), the paid amount by the selected payment method (amount 1) is smaller than the total amount for purchased articles that can be paid by this selected payment method (amount 2) and the payment cannot be continued. Therefore, an error to disable payment is returned (ACT 39).

On the other hand, if the amount 1 is equal to or greater than the amount 2 (amount 1≧amount 2) (YES in ACT 38), the paid amount by the selected payment method (amount 1) is equal to or greater than the total amount for purchased articles that can be paid by this payment method (amount 2). Therefore, the CPU 11 subtracts the total amount for articles for which payment by the selected payment method is not prohibited, from the total amount for articles sold in the transaction, and thus calculates the remainder (ACT 40). Then, the CPU 11 causes the cashier-side display device 6 to display a screen 60 to confirm the continuation of payment (ACT 41).

Figure 7:
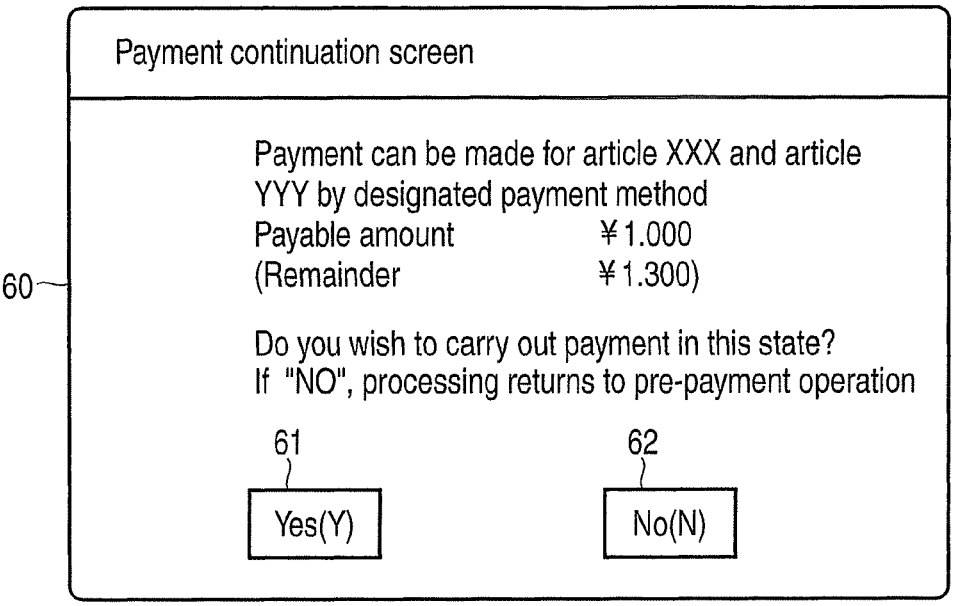
FIG. 7 shows an exemplary payment confirmation screen displayed on a display device of the POS terminal.

FIG. 7 shows an example of the screen 60. In this example, the sales data shown in FIG. 3 is stored in the transaction buffer 31. Also, in this example, the voucher key is inputted in ACT 30 and the paid amount by this voucher is 2,000 yen.

As shown in FIG. 7, in the screen 60, the names of articles for which payment by the same payment method is not prohibited (XXX and YYY in FIG. 7), the total value of the prices of those articles (\1,000 in FIG. 7), the total value of the prices of articles for which payment by the same payment method is prohibited and the price is yet to be paid (\1,300 in FIG. 7), and an enter button 61 (YES(Y) in FIG. 7) and a cancel button 62 (NO(N) in FIG. 7) that can be operated by touch via a touch panel are shown. In this state, the CPU 11 waits for the screen 60 to be operated by touch. Here, if a touch operation of the enter button 61 is detected by the touch panel (YES in ACT 42, continue payment), the CPU 11 proceeds to payment in ACT 43. That is, the total amount for articles for which the prohibition flag is "0" with respect to payment by voucher is 1,000 yen as can be seen in FIG. 3. Therefore, the CPU 11 executes payment of 1,000 yen. After that, the CPU 11 sets the payment completion flag with respect to the record of the articles for which payment is completed in the transaction buffer 31, to "1".

After that, the CPU 11 returns to the processing of ACT 31. The CPU 11 then repeats the processing of ACT 31 to ACT 43 until sales data having the payment completion flag "0" are no longer stored in the transaction buffer 31 (NO in ACT 34). Meanwhile, if a touch operation of the cancel button 62 is detected by the touch panel in ACT 42 (NO in ACT 42), the CPU 11 returns to the processing of ACT 31 without executing the processing of ACT 43. That is, the CPU 11 accepts selection of a payment method again and then executes the processing of ACT 31 and the subsequent processing by the selected payment method.

If sales data having the payment type prohibition flag "1" corresponding to the selected payment method are not stored in the transaction buffer 31 in ACT 34 (NO in ACT 34), it is possible to pay the total amount for the articles for which payment is not completed, by the payment method selected in ACT 31. In this case, the CPU 11 executes payment by that payment method. The CPU 11 also sets the payment completion flag corresponding to the articles for which payment is completed, to "1" (ACT 35). After that, the CPU 11 resets each of the subtotal flag and the registration-in-progress flag to "0" (ACT 36) and ends the one transaction.

In this way, even if articles purchased by a customer who wants to use a specific payment method include articles for which the specific payment method is prohibited, the POS terminal 1 according to this embodiment first starts executing payment with articles for which payment by the specific payment method can be made, and then accepts selection of another payment method with respect to articles for which payment by the specific payment method cannot be made. Alternately, the payment method itself is changed to another payment method for all the articles. Thus, it is no longer necessary to carry out troublesome operations such as deleting articles for which payment by a specific payment method cannot be made and then registering these articles again. Transactions can be carried out efficiently.

Each configuration disclosed in the above embodiment can be modified in practice without departing from its scope.

For example, the embodiment shows a POS terminal that supports four types of payment methods, that is, voucher, electronic money, credit card, and cash. However, any POS terminal that supports two or more types of payment methods has similar advantages to those of the above embodiment.

Figure 8:
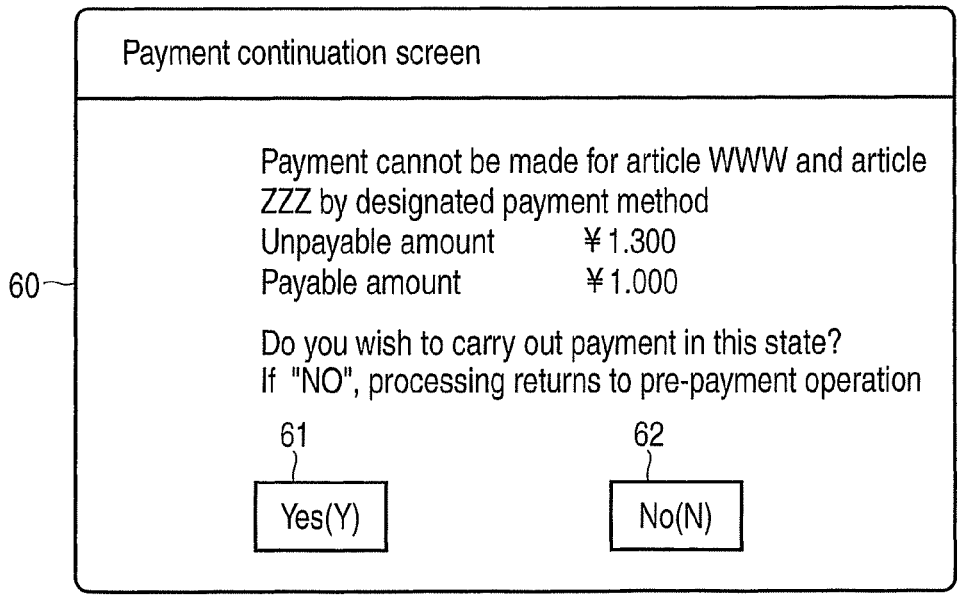
FIG. 8 shows another exemplary payment confirmation screen displayed on the display device of the POS terminal.

The layout in the screen 60 is not limited to the layout shown in FIG. 7, either. In FIG. 7, the names of articles for which payment by the selection-accepted payment method is not prohibited are displayed on the cashier-side display device 6 and an inquiry is given as to whether to continue payment or not. However, the screen 60 showing the names of articles for which payment by the selection-accepted payment method is prohibited as shown in FIG. 8 (WWW and ZZZ in FIG. 8) may be displayed on the cashier-side display device 6 and an inquiry may be given as to whether to continue payment or not. Also, a touch panel may be provided on the customer-side display device 7 and the screen 60 may be displayed on the customer-side display device 7 so that the customer can select whether to continue payment or not.

In the above embodiment, the control program to realize each function is recorded in advance in the POS terminal. However, the provision of the control program is not limited to this embodiment. A similar control program may be downloaded to the POS terminal from a network, or a control program stored in a recording medium may be installed in the POS terminal. As the recording medium, any recording medium that can store a program and can be read by the POS terminal may be used, such as CD-ROM. The function to acquire the control program by installation or downloading may be realized in cooperation with the OS (operating system) in the POS terminal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An article sales data processing apparatus comprising:
a storage unit which stores, for respective articles sold in one transaction, sales data including at least an amount of the respective articles, information indicating a payment method, of plural payment methods, prohibited for the respective articles, and a payment completion flag which identifies whether payment processing for the respective articles is completed;
a selection acceptance unit which accepts selection of a payment method from the plural payment methods;
a confirmation unit which confirms, based on the information indicating the payment method prohibited for the respective articles, whether articles sold in the one transaction include an article for which payment by the payment method selected via the selection acceptance unit is prohibited; and
a payment processing unit which, if the confirmation unit confirms that the articles sold in the one transaction include the article for which payment by the payment method selected via the selection acceptance unit is prohibited, calculates a sum of prices of a subset of the articles sold in the one transaction for which payment by the payment method selected via the selection acceptance unit is not prohibited based on the sales data stored in the storage unit, displays a screen for selecting whether payment of the one transaction is to be continued if the sum is equal to or less than an amount payable by the payment method selected via the selection acceptance unit, executes payment for the subset of the articles for which the payment method selected via the selection acceptance unit is not prohibited, using the payment method selected via the selection acceptance unit, in response to a selection to continue payment via the screen, and changes payment completion flags stored in the storage unit for respective articles sold in the one transaction for which the payment processing is executed to states indicating completion of payment processing,
wherein the selection acceptance unit, the confirmation unit, and the payment processing unit continue processing the one transaction until all payment completion flags associated with the respective articles sold in the one transaction are changed to states indicating completion of payment processing.

2. The apparatus of claim 1, wherein in response to confirmation by the confirmation unit that the articles sold in the one transaction do not include an article for which payment by the payment method selected via the selection acceptance unit is prohibited, the payment processing unit executes payment by the payment method selected via the selection acceptance unit for all the articles sold in the transaction.

3. The apparatus of claim 1, further comprising a display device,
wherein the payment processing unit causes the display device to display a name of an article, of the subset of the articles, for which payment by the payment method selected via the selection acceptance unit is not prohibited.

4. The apparatus of claim 3, wherein the payment processing unit causes the display device to display, in addition to the name of the article for which payment by the payment method selected via the selection acceptance unit is not prohibited, a total value of price for the article for which payment by the payment method selected via the selection acceptance unit is not prohibited.

5. The apparatus of claim 3, wherein the payment processing unit causes the display device to display, in addition to the name of the article for which payment by the payment method selected via the selection acceptance unit is not prohibited, a total value of price for the article for which payment by the payment method selected via the selection acceptance unit is prohibited.

6. The apparatus of claim 1, further comprising a display device,
wherein the payment processing unit causes the display device to display a name of the article for which payment by the payment method selected via the selection acceptance unit is prohibited.

7. The apparatus of claim 1, further comprising a display device with a touch panel,
wherein the payment processing unit causes the display device to display a screen in which an operation button operable via the touch panel is arranged, and accepts selection as to whether to execute payment for the one transaction via the screen.

8. A control method for an article sales data processing apparatus comprising a storage unit which stores, for respective articles sold in one transaction, sales data including at least an amount for the respective articles, information indicating a payment method prohibited, of plural payment methods, for the respective articles, and a payment completion flag which identifies whether payment processing for the respective articles is completed, the control method comprising:

accepting selection of a selected payment method from the plural payment methods;

confirming, based on the information indicating the payment method prohibited for the respective articles, whether articles sold in the one transaction include an article for which payment by the selected payment method is prohibited;

if it is confirmed that the articles sold in the one transaction include the article for which payment by the selected payment method is prohibited, calculating a sum of prices of a subset of the articles for which payment by the selected payment method is not prohibited based on the sales data stored in the storage unit, displaying a screen for selecting whether payment of the one transaction is to be continued if the sum is equal to or smaller than an amount payable by the selected payment method on a display, executing payment for the subset of the articles for which the selected payment method is not prohibited, by the same payment method, in response to a selection to continue the payment via the screen, and changing payment completion flags stored in the storage unit for respective articles sold in the one transaction for which the payment processing is executed to states indicating completion of payment processing; and continuing the accepting, the referring, the calculating, the displaying, the executing, and the changing until the payment confirmation flags of the articles sold in one transaction are all changed to states indicating completion of payment processing.

\* \* \* \* \*